US011590049B2

(12) United States Patent
Kuhn et al.

(10) Patent No.: US 11,590,049 B2
(45) Date of Patent: Feb. 28, 2023

(54) MOVEMENT-DEPENDENT STABILIZATION SUPPORT SYSTEM

(71) Applicants: Elvira Kuhn, Trier (DE); Feodor Kusmartsev, Loughborough (DE)

(72) Inventors: Elvira Kuhn, Trier (DE); Feodor Kusmartsev, Loughborough (GB); Michael Flad, Karlsruhe (DE); Sören Hohmann, Bruchsal (DE); Florian Köpf, Karlsruhe (DE)

( * ) Notice: Subject to any disclaimer, the term of this patent is extended or adjusted under 35 U.S.C. 154(b) by 0 days.

(21) Appl. No.: 17/614,851

(22) PCT Filed: Jul. 9, 2020

(86) PCT No.: PCT/EP2020/069379
§ 371 (c)(1),
(2) Date: Nov. 29, 2021

(87) PCT Pub. No.: WO2021/005160
PCT Pub. Date: Jan. 14, 2021

(65) Prior Publication Data
US 2022/0233390 A1 Jul. 28, 2022

(30) Foreign Application Priority Data
Jul. 10, 2019 (DE) ............... 10 2019 210 232.8

(51) Int. Cl.
*A61H 3/00* (2006.01)
*B25J 9/00* (2006.01)
(Continued)

(52) U.S. Cl.
CPC ............ *A61H 3/00* (2013.01); *B25J 9/0006* (2013.01); *B25J 9/1605* (2013.01); *B25J 13/088* (2013.01);
(Continued)

(58) Field of Classification Search
CPC ... A61H 3/00; A61H 2230/625; B25J 9/0006; B25J 9/1605; B25J 13/088; F16F 9/535; F16F 2230/18
See application file for complete search history.

(56) References Cited

U.S. PATENT DOCUMENTS

2016/0171864 A1* 6/2016 Ciaramelletti ......... A42B 3/046
340/539.11
2016/0288848 A1* 10/2016 Hurst .................... G06N 3/008
(Continued)

FOREIGN PATENT DOCUMENTS

EP 3342390 A1 7/2018

*Primary Examiner* — Jerrah Edwards
*Assistant Examiner* — Aren Patel
(74) *Attorney, Agent, or Firm* — David Guerra

(57) ABSTRACT

The present invention relates to a movement-dependent stabilisation support system (100) for stabilising a moving body (200), which comprises a plurality of sensors (110), a plurality of actuators (120) and a control unit (130). The plurality of sensors (110) continuously detects movement parameters of the body (200), on which basis the control unit (130) determines whether there is an instability of the body (200). If it is determined that there is an instability, the control unit (130) selects a stabilisation strategy, according to which the actuators (120) are controlled. When controlled, the actuators (120) attached to the body (200) stiffen and limit the freedom of movement of the body (200), such that a movement in the direction of the imminent unstable state is prevented or suppressed. In this way, the body (200) is supported in its stabilisation and an imminent fall is prevented.

19 Claims, 6 Drawing Sheets

(51) Int. Cl.
*B25J 9/16* (2006.01)
*B25J 13/08* (2006.01)
*F16F 9/53* (2006.01)

(52) U.S. Cl.
CPC ........ *F16F 9/535* (2013.01); *A61H 2230/625* (2013.01); *F16F 2230/18* (2013.01)

(56) References Cited

U.S. PATENT DOCUMENTS

| | | | |
|---|---|---|---|
| 2016/0306944 A1* | 10/2016 | Grady | G16H 50/50 |
| 2016/0346156 A1 | 12/2016 | Walsh et al. | |
| 2018/0280693 A1* | 10/2018 | Edgerton | A61N 1/0476 |
| 2019/0249746 A1* | 8/2019 | Saley | A41D 13/015 |
| 2019/0283247 A1* | 9/2019 | Chang | G05B 17/02 |
| 2020/0069441 A1* | 3/2020 | Larose | A61H 3/00 |

\* cited by examiner

Fig. 7A
Fig. 7B
Fig. 7C
Fig. 7D
Fig. 7E
$$m_1\ddot{y}_s - m_1l_1\ddot{\theta}\sin\theta - m_1l_1\dot{\theta}^2\cos\theta + m_2\ddot{y}_s - m_2l_1\ddot{\theta}\sin\theta - m_2l_1\dot{\theta}^2\cos\theta - m_2l_2\ddot{\phi}\sin\phi$$
$$-m_2l_2\dot{\phi}^2\cos\phi + m_1g + m_2g + k(y_s - y_0) = 0$$
Fig. 8

MOVEMENT-DEPENDENT STABILIZATION SUPPORT SYSTEM

CROSS-REFERENCE TO RELATED APPLICATIONS

This application is an U.S. national phase application under 35 U.S.C. § 371 based upon co-pending International Application No. PCT/EP2020/069379 filed on Jul. 9, 2020. Additionally, this U.S. national phase application claims the benefit of priority of co-pending International Application No. PCT/EP2020/069379 filed on Jul. 9, 2020 and German Application No. 10 2019 210 232.8 filed on Jul. 10, 2019. The entire disclosures of the prior applications are incorporated herein by reference. The international application was published on Jan. 14, 2021 under Publication No. WO 2021/005160 A1.

BACKGROUND

Technical Field

The present invention relates to a system for detecting and preventing an imminent fall of a moving body.

Background Description

Every twelfth adult suffers an accident at least once a year in Germany, the most frequent cause of the accident being a fall. The proportion is almost 30% and increases with age, so that in humans over the age of 70, the majority of accidents is due to a fall. A considerable proportion of these accidents is associated with injuries which often require hospitalisation.

Due to the increased risk caused by falls, elderly people often withdraw from public life and spend time predominantly in familiar surroundings. The decreasing physical capacity thus leads to increasing social isolation.

It is thus desirable to reduce the number of falls without limiting the everyday physical capabilities of the persons concerned.

It goes without saying that an increased risk of a fall not only affects the elderly, but also persons who are limited in terms of their capabilities because of other reasons, for example during rehabilitation measures after an accident which has already occurred previously. Fall prevention is also useful for other movable bodies, such as, for example, a robot or an animal.

Fall detection has to date been solved technically by the use of assistance solutions which are located in the surroundings of the person. For example, a fall can be detected by sensors placed under a carpet, which are able to detect the position of the human after a fall.

There are also tools which help humans, not to fall or to perform desired movements. These include, for example, bracelets which recognise the fall as such, after it has already occurred, and trigger an alarm. In addition, exoskeletons, which actively support the muscles of the wearer, are known to assist the movement of a person.

However, the systems mentioned either only implement measures when a fall has already occurred, or actively support the wearer of the system in his/her/its current position of movement. This means that the aforesaid systems are not designed to prevent a fall.

Furthermore, exoskeletons with active movement support are usually heavy, inflexible and energy-intensive, so that they play no role in everyday life.

SUMMARY

Taking into account to above-mentioned drawbacks or inappropriateness of the state of the art, it is, accordingly, an object of the present invention to provide an improved system as well as an improved method for preventing a fall or supporting the stabilisation of a movable body.

This object is attained by the independent claims. The dependent claims define advantageous embodiments.

The present invention relates to a movement-dependent stabilisation support system for maintaining the stability of a moving body. The movement-dependent stabilisation support system comprises a plurality of sensors, designed to detect movement parameters of the body. In addition, the system comprises a plurality of actuators and a control unit, which is designed, on the basis of the movement parameters and a biomechanical movement model, to detect whether an instability of the body is imminent. The control unit is further designed to select a stabilisation strategy from a plurality of predetermined stabilisation strategies, when it has been detected that an instability of the body is imminent, and to control the actuators in accordance with the selected stabilisation strategy. In that regard, the actuators are flexibly-deformable and stiffen when controlled by the control unit.

In other words, the present invention relates to a system for preventing the fall of a movable body, such as a human being, or a person who moves in such a way that, without the intervention of the system, he/she would have fallen in the next moment.

By using a plurality of sensors, the system detects movement parameters of the body, allowing the system to continuously monitor the movement of the body.

On the basis of the detected sensor data or movement parameters and a biomechanical movement model, it is assessed whether the body might get into an unstable position. Based on the result of the assessment of the future instability and the movement parameters, a stabilisation strategy is selected, according to which the actuators, which are attached to the body, are controlled.

A stabilisation strategy is in this context a predefined specification for controlling the actuators in respect of an associated situation or estimated position of the body. A stabilisation strategy may include, for example, instructions having regard to which actuators are to be controlled at what time and in what way. The stabilisation strategy according to which the body is to be stabilised is thus selected from a plurality of predetermined stabilisation strategies. This is done on the basis of the detected movement parameters, the biomechanical movement model and the future position of the movable body determined therefrom.

A stabilisation strategy may in this context include a chronological sequence of the control of different actuator groups, in which case an actuator group contains a predefined subset of the actuators. Furthermore, a stabilisation strategy may comprise a multi-stage control specification, according to which a first actuator group is first controlled, and, if it is estimated that the fall continues to be imminent, a second actuator group is controlled. A control priority may thus be assigned to the actuators or actuator groups, so that further actuators can be stiffened in accordance with the control effect.

The actuators are, for example, attached at predetermined positions of the movable body and are flexibly deformable, so that the freedom of movement of the wearer of the system is not or only minimally restricted. However, when controlled by the control unit, the actuators stiffen. In the event of an imminent fall, the freedom of movement of the wearer of the system is thus restricted in a targeted manner in order to prevent the imminent unstable position from actually occurring.

The present invention thus attains that an imminent unstable situation of the movable body does not occur in that movement of the body into the unstable position is suppressed. An imminent fall is thus prevented.

According to a specific embodiment, the control unit is further designed to perform a control process for terminating actuator control for stabilisation purposes, based on the movement parameters.

That is to say, in a case where restriction of movement is no longer necessary, since a fall is no longer imminent or was successfully prevented, the control unit cancels the restriction of freedom of movement by suspending the control of the actuators as part of a control process. For example, stiffening of the individual actuators can be cancelled in succession or can, for example, be reduced gradually.

In this context, the movement parameters continue to be constantly detected and evaluated with regard to an imminent instability of the body. This ensures that no fall occurs, even in the event of, or during termination of, fall prevention. This is achieved by carrying out a specific control measure for suspending the fall prevention measure.

According to a preferred embodiment, the biomechanical movement model is based on a formalisation of the movement of a simple inverted pendulum or double-inverted pendulums.

An inverted pendulum is a pendulum with the centre of gravity above the axis. Such a pendulum finds itself in a rest position at its highest point, which it leaves however as soon as small deflections occur. Such a pendulum is suitable to easily model the position of a movable body, in particular a body of human shape. A stable state is usually maintained by a person through continuous perception of the position and corresponding movement.

The use of a simple inverted pendulum makes it possible to model the position of the movable body in a manner which requires only a minimal amount of computing effort.

A double-inverted pendulum is a combination of two simple inverted pendulums, with the second inverted pendulum mounted on the first inverted pendulum. Such a double-inverted pendulum is suitable for a more accurate modelling of the position of a human-like body. In particular, such a model is able to model the bending of a movable body, for example a body of human form.

According to a further preferred embodiment, the biomechanical movement model is based on the formalisation of the movement of a simple inverted pendulum on an elastic spring or a double-inverted pendulum on an elastic spring.

In other words, the movement or position of the body can be modelled by a simple inverted pendulum or a double-inverted pendulum, each mounted on a spring. In that regard, the spring represents flexibility of the body to be modelled in the direction of a vertical axis.

Using the above-mentioned models, which include the spring, a more accurate and/or realistic modelling of the movement of the movable body is possible, in which case the complexity of the description of the position or movement of the body increases as a result of the increasing number of degrees of freedom.

According to a further aspect, the biomechanical movement model is an expanded biomechanical movement model of the body that, by way of a system of inverted pendulums connected to elastic springs, models the human body's muscular system for persons of different ages.

That is to say, by coupling a plurality of inverted pendulums by means of elastic springs, a complex model of the movement of the movable body can be brought about. In particular, the properties of the movable body can be modelled close to reality through the properties of the springs (for example, the spring stiffness and the length of the springs). For example, the spring stiffness of the coupling springs for a young human wearer of the system can be set greater than for an older human wearer, in order to depict the different properties of the body's muscular system for persons of different ages.

According to a further embodiment, the control unit is further designed to determine the positions of predefined reference points of the biomechanical movement model, based on the movement parameters of the body received, and to detect the imminent instability of the body, based on trajectories of the reference points of the biomechanical movement model.

That means that the coordinates (positions of reference points) of the biomechanical movement model are determined on the basis of the movement parameters of the body. In order to assess the imminent instability, the time profile of the positions of the reference points of the biomechanical movement model is evaluated.

According to a preferred embodiment, the control unit detects the imminent instability of the body by calculating future positions on the basis of changes between previous and current positions of the reference points of the biomechanical movement model. If the future positions satisfy at least one condition from a plurality of predetermined conditions, the control unit recognises that an instability of the body is imminent.

This means that a prediction of a future position of the body can be made on the basis of sensor data or movement parameters which have been detected or recorded in the past. In other words, an extrapolation of the position of the body or of the biomechanical movement model is carried out, in order to assess an imminent instability of the body.

For this purpose, the movement parameters are used to determine positions of predetermined reference points of the biomechanical movement model at given times or at a predetermined detection rate. On the basis of the positions of the reference points of the model and the properties of the model (single/double-inverted pendulum, spring stiffness, lengths of the pendulum . . . ), the position is extrapolated into the future and the stability or instability is assessed on the basis of the future positions.

According to a further aspect, the sensors each comprise a memory unit and a computing unit, the memory unit being designed to store previous sensor data while the computing unit is designed to process the previous and current sensor data, and to record a processing result as movement parameters of the body.

This means that primary sensor data are first pre-processed within the sensor itself, and the result is passed on to the control unit as movement parameters. For example, pre-processing may include a determination of the changes in the primary sensor data, so that a change in the corresponding measured value instead of the measured value itself is made available to the control unit as a movement parameter. As a result, the computational complexity of the control unit is reduced and, in addition, the amount of data to be transmitted is also reduced.

According to a preferred embodiment, after detecting the imminent instability of the body, based on movement parameters of the body, the control unit recognises whether or not the instability of the body persists. The control unit controls the actuators accordingly.

This means that, after detection of the imminent instability, not only is the appropriate measure taken (selection of the stabilisation strategy and control of the corresponding actuators), but rather the position or movement of the body is continuously monitored, so that it can be detected whether the instability continues to be imminent or the initiated stabilisation strategy and/or fall prevention can be terminated.

According to a specific embodiment, the actuators have a tube-like shape and are filled with a magnetically-sensitive or an electrically-sensitive medium which, when actuated, is stiffened by the control unit.

In other words, the actuators have an elongated shape of small width, compared to the length. The outer structure of the actuators is hollow and filled with a material which changes its elastic deformability when an electric or magnetic field is applied, so that a higher level of force is necessary in order to attain the same deformation, in comparison with the case where no electric or magnetic field is applied. Alternatively, the aforesaid material may change its deformability, when a flow of current through the material is present.

As a result, when the actuators are controlled by the control unit, the actuators stiffen, causing the freedom of movement of the body to become restricted. In contrast, if no electric or magnetic field is applied, the actuators can be deformed using minimal force, so that the freedom of movement of the wearer of the system is only minimally restricted or not at all.

An electrically-sensitive material refers, for example, to electroactive polymers that change their mechanical properties by applying electrical voltage.

In a specific embodiment, the actuators include a magnetorheological fluid that stiffens upon application of a magnetic field. In this case, the actuators each comprise a magnetic field generator which, when controlled by the control unit, generates a magnetic field for stiffening the magnetorheological fluid.

A magnetorheological fluid is a suspension of magnetically-polarised particles which are finely distributed in a carrier liquid. In that regard, the particles are larger by approximately one to three powers of ten than those of the ferrofluids, as a result of which a magnetorheological fluid stiffens when a magnetic field is applied.

According to a further aspect, the sensors are inertial measuring units which detect accelerations or rotation rates as movement parameters of the body.

For example, these may be sensors for measuring a linear acceleration, the change in a rotation rate or a rotation rate itself. By simple or multiple integration of the measured values into the time dimension, it is possible to infer positions or angles.

The moving body may be a person or a humanoid robot.

According to a specific embodiment, the plurality of sensors is designed to be attached to at least hips, shoulders, hands and/or head of the person or humanoid robot.

This means that the evaluation of the sensor data can be used to determine positions of the hips, shoulders, arms, hands and/or the head.

According to a further aspect, the plurality of actuators is designed to be attached in the region of joints and/or of the torso of the person or of the humanoid robot in order to limit the freedom of movement of the joints and/or of the torso by stiffening, when controlled by the control unit.

According to a further specific embodiment, the movement-dependent stabilisation support system further comprises a plurality of second actuators, which are designed to perform an active movement, when controlled by the control unit. The control unit is in this case furthermore designed to control the second actuators in accordance with the selected stabilisation strategy.

That is to say, in addition to the actuators which stiffen, when controlled by the control unit, the system may comprise further second actuators which, when controlled by the control unit, perform an active movement.

This, in addition to restricting the freedom of movement of the body, allows also an active intervention in the movement, so that, when a fall is imminent and this cannot be prevented solely by stiffening the actuators, a movement of the body towards a stable state can be forced by the second actuators.

According to a further aspect, the movement-dependent stabilisation support system can comprise a storage unit which continuously stores detected movement parameters and selected and performed stabilisation strategies.

In addition, the system can comprise a programming interface (API) via which the stored content of the storage unit can be made available to an external device.

On the basis of the parameters provided and stabilisation strategies selected/performed, an analysis of the effects of the stabilisation strategies can be carried out in order to adapt the parameters of the biomechanical movement model and the stabilisation strategies, as a result of which the stabilisation support can be optimised.

As a result, as also already done in an initialisation process, the system and the model used can be adapted to the individual properties of the wearer.

The present invention further relates to a movement-dependent stabilisation support method for maintaining the stability of a moving body. The movement-dependent stabilisation support method comprises detecting movement parameters of the body, and recognising whether an instability of the body is imminent, based on the movement parameters and a biomechanical movement model. Furthermore, the method comprises selecting a stabilisation strategy from a plurality of predetermined stabilisation strategies if it has been detected that an instability of the body is imminent, as well as the stiffening of flexibly-deformable actuators in accordance with the selected stabilisation strategy.

Using the system of the present invention, a future unstable state of the wearer of the system, i.e, the moving body, can be reliably predicted and appropriate countermeasures can be taken. In particular, the freedom of movement of the body can be restricted in such a way that a movement, which would lead to an unstable state, is rendered more difficult. The result achieved is that an impending fall does not take place.

Additional advantages and benefits of the present invention will become apparent from the detailed description of a preferred embodiment and the drawings.

BRIEF DESCRIPTION OF THE DRAWINGS

FIGS. 7A to 7E show, by way of example, the position of the support base for different positions of the feet of a human wearer of the system when standing and when in motion.

FIG. 8 shows, by way of example, the formalisation of a movement as a trajectory of a double-inverted pendulum on an elastic spring.

DETAILED DESCRIPTION OF THE PREFERRED EMBODIMENT

In the following, a preferred embodiment of the present invention will be described in detail with reference to the drawings.

Figure 1:
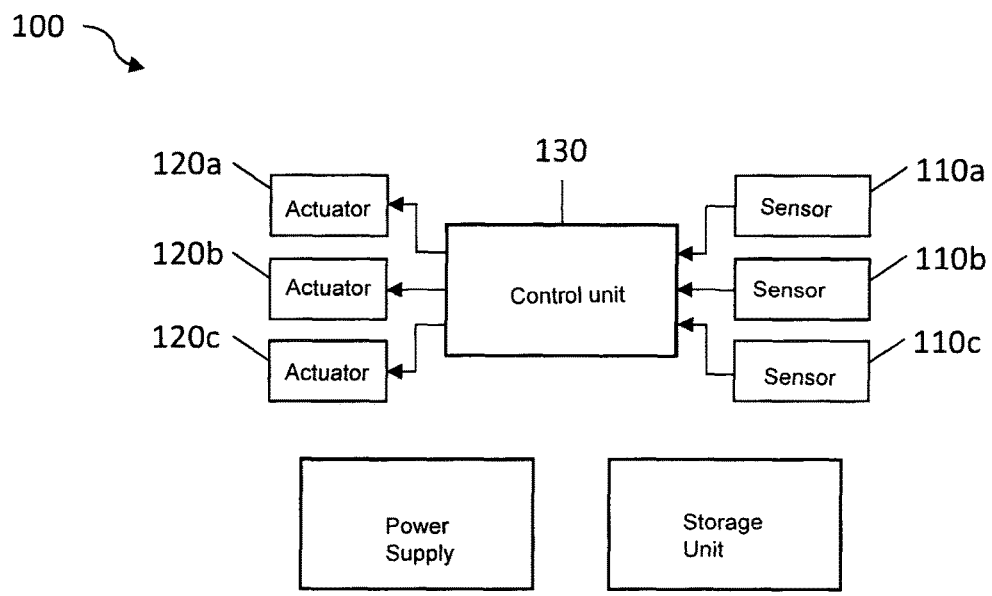
FIG. 1 shows a schematic block diagram of the components of the movement-dependent stabilisation support system.

FIG. 1 shows a block diagram of the movement-dependent stabilisation system 100 according to a preferred embodiment.

The movement-dependent stabilisation system 100 (also referred to below as a stabilisation system 100 or system 100) comprises a plurality of sensors 110a-110c which detect movement parameters of the body 200. Furthermore, the system comprises a plurality of actuators 120a-120c and a control unit 130. In addition, the system includes a power supply, such as a battery, an accumulator, a wireless power supply system, or another power supply source for powering the individual components, and a storage unit, such as a RAM, a ROM, or a hard disk drive, which can be accessed by the control unit 130.

Figures 2, 3:
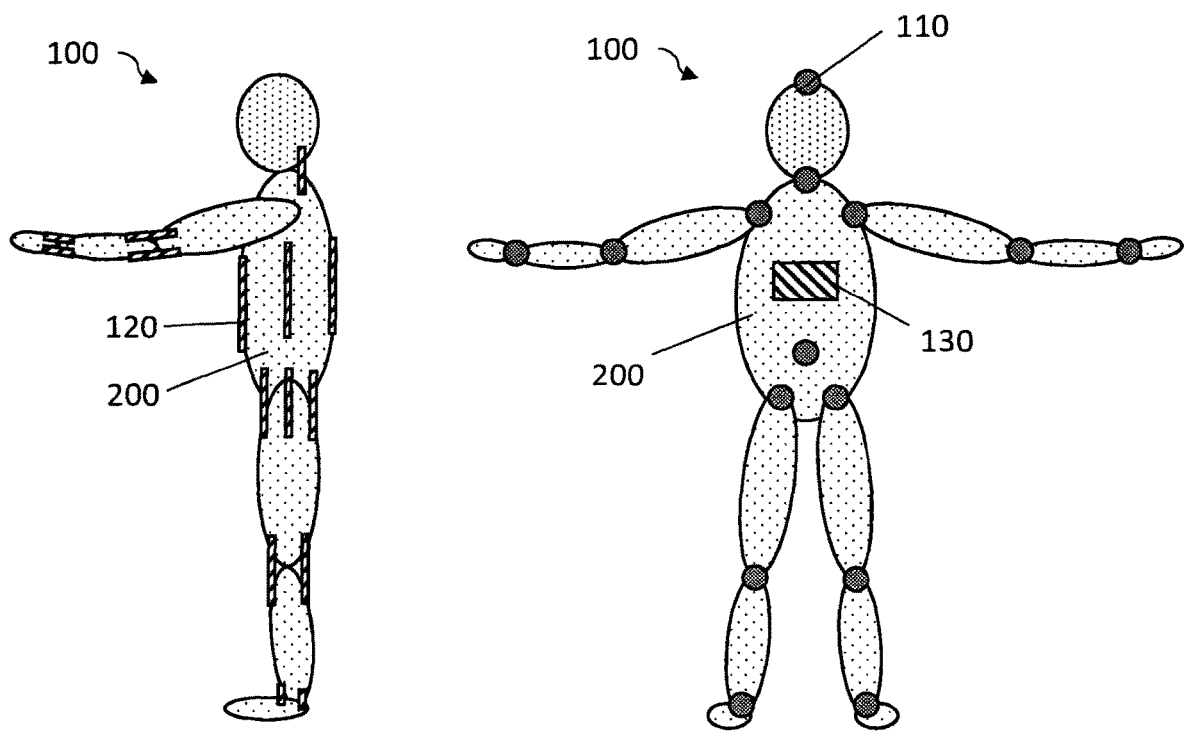
FIG. 2 shows the position of the actuators in one embodiment of the movement-dependent stabilisation support system on a human wearer.
FIG. 3 shows the position of the sensors and the control unit in one embodiment of the movement-dependent stabilisation support system on a human wearer.

FIGS. 2 and 3 show the position of the sensors 110 and actuators 120 of the stabilisation system 100 on a human wearer (a person) as a movable body 200. The actuators 120 are fitted in the regions of the joints of the person 200, as well as in the region of the torso on the front side, on the rear side (the back) and laterally. Furthermore, an actuator 120 is fastened in the region of the neck of the person.

The sensors 110 are located on the upper side of the head, in the region of the neck and near the centre of the body and the joints in the region of the shoulders, the elbows, the wrists, the hips, the knees and the ankles.

The present invention is not limited to the described position of the actuators 120. The actuators 120 may, for example, be attached only in the region of the legs and the hips. Furthermore, a plurality of actuators 120 can be located in the region of the back, in particular in the region of the spinal column.

Furthermore, the present invention is not limited to the described position of the sensors 110. These can be attached, for example, in the middle of parts of the extremities, instead of in the region of the joints of the person 200. Thus, one sensor each might be fitted in the region of the palm, in the region of the lower and upper arms and in the region of the lower legs and thighs.

Furthermore, the stabilisation system 100 comprises the control unit 130, which, as can be seen from FIG. 3, is attached in the region of the chest of the person 200. However, the present invention is not limited to this position of the control unit. Rather, it may be attached anywhere on the body 200. Alternatively, it is possible that it is not directly attached to the person, but, for example, can be carried in a backpack or be injected onto an integrated circuit (chip).

The stabilisation system further comprises a power or energy supply system, such as a battery, together with power supply lines, and communication lines for signal transmission between the individual components of system 100.

The present invention is not limited to a central power supply system. Instead, each individual component may include an appropriate power supply.

This can be realised, for example, as a common transmission line between the individual components of the stabilisation system 100 in the form of a BUS-line. However, the present invention is not restricted to data transmission in a BUS-system, instead, the data transmission between the individual components can take place in any desired manner. Wireless data transmission between the components, for example, via a local wireless network (WLAN) or via Bluetooth® connections, is also possible.

The system 100 may be embedded in a support structure that may be attached to the person 200. Alternatively, the components may be integrated into textiles worn by the person 200. The present invention is not restricted to a specific support system or method of attaching the individual components, provided the sensors are able to detect required movement parameters and the actuators restrict the freedom of movement of the person 200 during stiffening.

The sensors 110 detect movement parameters of the body 200 and pass them on to the control unit 130. The movement parameters may be, for example, acceleration values, speed values or rotation rates, depending on the specificity of the individual sensors 110a-110c. In this case, the movement parameters are transmitted at predefined regular intervals, for example every 0.1, 0.2, 0.5 or 1 seconds.

However, the present invention is not limited to a specific transmission/detection rate. Instead, the movement parameters can be transmitted to the control unit 130 at any regular or even irregular times.

The control unit further comprises a memory unit which stores the movement parameters as received.

On the basis of the movement parameters received or the changes in the movement data, the control unit 130 determines the positions of reference points of a biomechanical movement model.

Figure 4A:
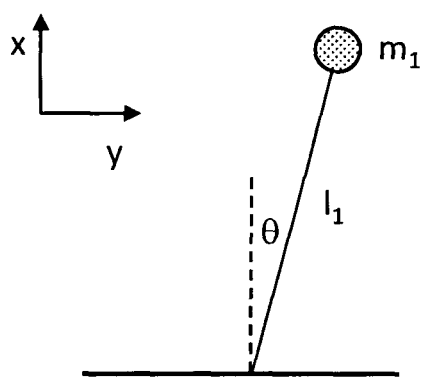
FIGS. 4A to 4D show examples of biomechanical movement models, on the basis of which the future stability of a wearer of the stabilisation support system can be determined.
Figure 4B:
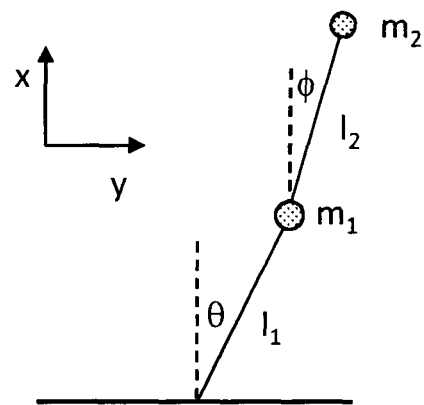

FIGS. 4A to 4B show, by way of example, four biomechanical movement models of different complexity.

By way of example, FIG. 4A illustrates a biomechanical movement model based on a simple inverted pendulum. The position of the biomechanical movement model is clearly defined by the angular deflection 8 from the equilibrium position. The parameters l1 and m1, which denote the length and the mass of the pendulum, are predefined and can be configured, for example, as part of the initialisation of system 100.

FIG. 4B shows, by way of example, a biomechanical movement model, based on double-inverted pendulums. The position of this biomechanical movement model is defined by the angular deflection 8 of the first inverted pendulum and the angular deflection φ of the second inverted pendulum. The parameters l1, m1, l2 and m2, which denote the length of the first pendulum, the first mass, the length of the second pendulum and the second mass, are predetermined and can be configured, like in the case of the simple inverted pendulum, as part of the initialisation of system 100.

Figure 4C:
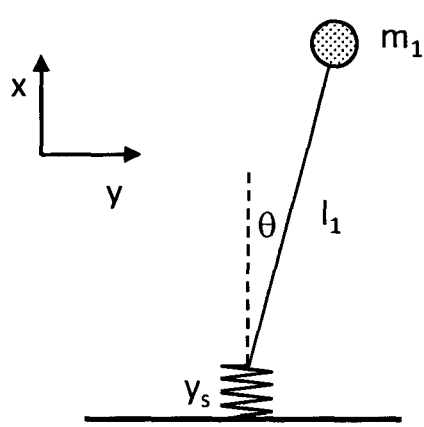
Figure 4D:
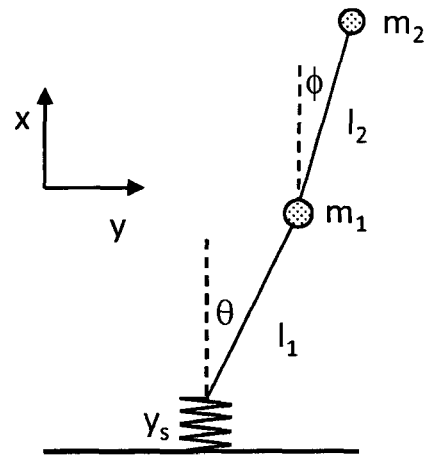

The examples of biomechanical movement models, shown in FIGS. 4C and 4D, correspond to the models shown in FIGS. 4A and 4B, the models additionally including an elastic spring on which the pendulums are mounted. The spring deflection ys and the spring stiffness k of the spring are thus added as further parameters of the position of the movement models.

As already described, the parameters of the biomechanical movement model defining the characteristics of the model, may be configured as part of the initialisation of system 100. In this case, the properties of the body 200 to be stabilised by the system 100, can be taken into account, such that the model can optimally represent the movement of the person (of the body) 200.

For example, the properties of the person 200, on the basis of which the model parameters are initialised, can include body size, length of the extremities, age and weight. However, the present invention is not limited to these properties. In particular, a standard configuration can be specified which does not take into account the individual geometric properties of the body. On the other hand, for example, detailed weight distribution and/or the geometry of the person 200 may serve as a basis for initialising the model parameters.

The biomechanical movement models shown in FIGS. 4A to 4D are limited to two dimensions (x,y), with y denoting a forward direction of the body 200 and y denoting a vertical axis of the body 200. However, the present invention is not limited to a model in two dimensions, and an upgrade of the biomechanical movement models to three dimensions is possible, which additionally takes into account a deflection perpendicular to the illustrated directions, i.e, into or from the drawing plane. In order to describe the position of the movement models, additional angular deflection coordinates are required which map the deflection of the individual pendulums into the drawing plane. Since an expansion to three dimensions does not change the basic principle of the present invention, but by virtue of the higher degree of complexity allows for a more precise/extended description of the position of the body 200, a pictorial representation was dispensed with here.

Furthermore, the present invention is not limited to the movement models shown in FIGS. 4A to 4D. Rather, by adding further pendulums, the position, for example, of the arms, of both legs and/or of the head can be taken into account. Furthermore, the biomechanical movement model can include a further inverted double pendulum, which is coupled to the illustrated model via a further spring with associated spring stiffness.

On the basis of the movement parameters which are detected by the sensors 110 and forwarded to the control unit 130, the control unit 130 first determines the coordinates for describing the position of the biomechanical movement model. Furthermore, on the basis of the movement parameters and the position of the biomechanical movement model, the control unit determines the position of reference points, in particular the position of the head, the hands, the body centre of gravity and/or the feet of the person 200. The control unit 120 [sic] further detects the position of the vertical projections of the reference points onto the standing plane of the body.

Figure 5A:
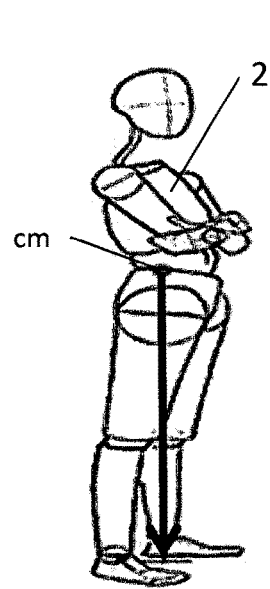
FIGS. 5A to 5C show, by way of example, the position of the centre of gravity in a wearer of the stabilisation support system and its vertical position in relation to the standing plane of the body.
Figure 5B:
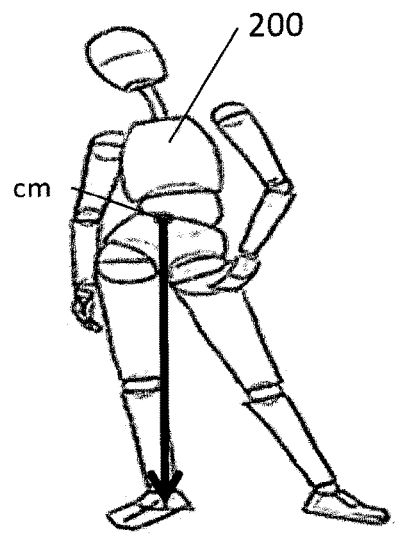
Figure 5C:
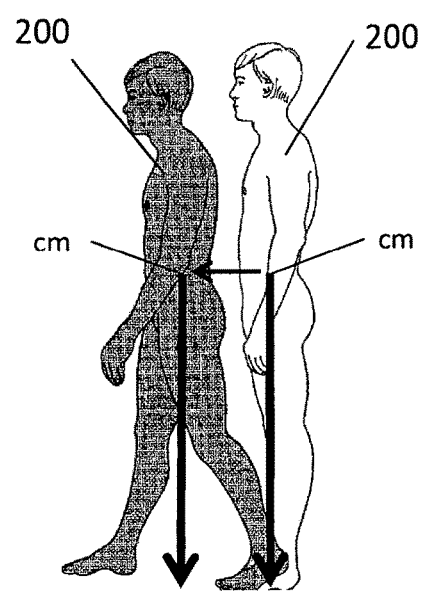

FIGS. 5A to 5C show, by way of example, the vertical projection of the centre of gravity CM of the body onto the standing plane of the person 200. FIGS. 5A and 5B show the person 200 while standing in different body positions and the corresponding vertical projection directions show the body's centre of gravity CM. FIG. 5C illustrates the position of the body's centre CM of a person 200 in motion as compared to the standing position. The direction of movement is indicated by a horizontal arrow.

Figure 6A:
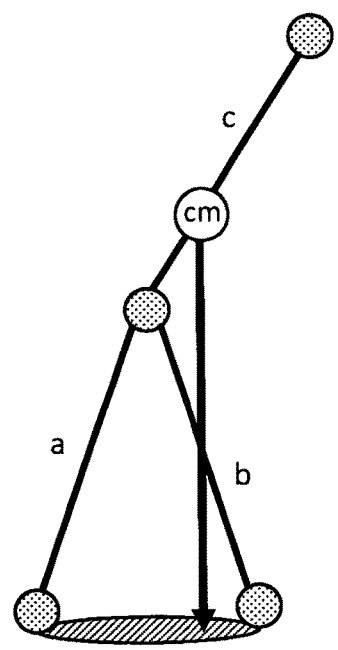
FIG. 6A shows, by way of example, the position of the vertical projection of the centre of gravity onto the standing plane of the body and its relative position with respect to the support base in the case of a stable position of the body.
Figure 6B:
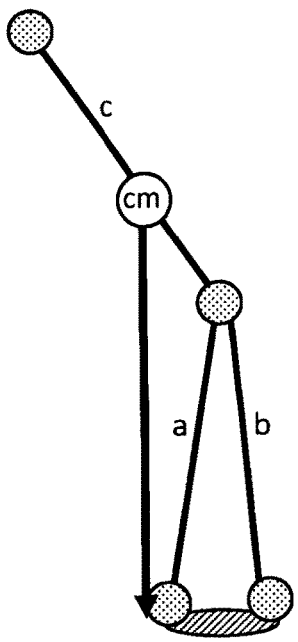
FIG. 6B shows, by way of example, the position of the vertical projection of the centre of gravity onto the standing plane of the body and its relative position with respect to the support base in the case of an unstable position of the body.

FIGS. 6A and 6B show schematic positions of biomechanical movement models, which respectively represent the two legs (a, b) and the upper body (c) of a person 200. The vertical projection of the body's centre of gravity CM onto the standing plane is indicated by an arrow. The positions of the feet define the support base which is defined by a surface between the contact points of the feet and the standing plane of the body 200.

In FIG. 6A, the projection of the body's centre of gravity CM is located within the support base. Such a position of the movement model in FIG. 6A can be regarded as "stable". In contrast, the projection of the body's centre of gravity of the movement model in FIG. 6B is outside the support base, so that the position of the movement model can be regarded as "unstable".

To illustrate the definition of the support base, FIGS. 7A to 7C show the contact surfaces of the feet of a person 200 with the standing surface and the support base defined thereby as a surface between and including the contact surfaces of the feet for a person 200 in the standing position. The support base is characterised by a dashed line. FIGS. 7A and 7B show a two-legged standing position, whereas FIG. 7C represents a one-legged standing position.

FIGS. 7D and 7E each show a support base for a person 200 in motion. Due to the movement of the person 200, the support base is extended forward in comparison with the standing position.

The control unit 130 determines the positions of reference points of the person 200 and the corresponding position of the biomechanical movement model on the basis of the movement parameters at specific points in time. The times can be defined, for example, by a temporally-equidistant grid. This means that the determination of the positions of the reference points and the position of the movement model is detected in specific time steps. By way of the preceding movement parameters, reference positions and the position of the movement model, for example at a time $t_{i-1}$ and at the current point in time $t_i$, the position of the movement model at a future point in time $t_{i+1}$ is determined on the basis of the movement model.

This is done on the basis of formalising the movement of the movement model, as shown, by way of example, in FIG. 8. FIG. 8 shows the formalisation of a movement model of a double-inverted pendulum on an elastic spring, as shown in FIG. 4D. The future position of the movement model and the corresponding reference positions of the person 200, are calculated on the basis of the mathematical model.

After calculating the future position of the movement model, the control unit 130 determines whether the future position satisfies a predetermined condition. The predetermined conditions can be stored in the memory unit, for example, in the form of a database, which can be accessed by the control unit 130. The predetermined conditions define positions of the movement model or positions of the reference points of the body which are associated with an instability of the person 200 and which require the intervention of the system 100 to prevent an impending fall.

For this purpose, each predetermined condition is linked to a stabilisation strategy. In that regard, a stabilisation strategy represents a specification for controlling the actuators 120, in order to prevent the person 200 from coming into the imminent unstable position. That is to say, on the basis of the determined future position of the movement model and the corresponding reference positions of the person 200, an appropriate stabilisation strategy is selected if it has been estimated that the person 200 (the body) will move into an unstable position.

In this context, the stabilisation strategies define the actuators which are to be controlled and the time when they are to be controlled. In this regard, a priority control may, for example, be defined. This means that first a specific actuator 120 or a specific group of actuators is controlled, and only if it is estimated in a next time step that the future unstable position of the person 200 could not be prevented by the control of the actuators 120, will a second actuator or a second actuator group be controlled.

The control unit 130 controls the actuators 120 in accordance with the selected stabilisation strategy. While the actuators 120 are controlled, i.e. during carrying out the stabilisation strategy according to the selected stabilisation strategy, the current and future position of the person 200 continues to be constantly determined and, if the imminent instability was prevented, actuator 120 control is terminated. In this case, a control process for terminating the actuator control is carried out by the control unit 130.

For a stability analysis, for example, the following geometric data can be used: body size, weight of the person 200, length of the legs and of the arms, height of the body centre above the ground and its respective position, projected as a perpendicular to the standing surface, the support base, the head centre position and/or the positions of joints, such as ankles, knees, hips, shoulders, elbows or wrist joints.

The following Table 1 shows, by way of example, some predetermined conditions for determining an imminent instability of the person 200.

TABLE 1

Examples of predefined conditions for determining an imminent instability of the person 200.

| Position | Range/cm | Changes/cm |
|---|---|---|
| Body centre | 10-40 | 5-15 |
| Left hip | 10-15 | 5-10 |
| Right hip | 10-15 | 5-10 |
| Right shoulder | 10-60 | 5-20 |
| Left shoulder | 10-60 | 5-20 |
| Distance between body centre and support base | 5-35 | 5-20 |
| ... | ... | ... |

In Table 1, the reference positions of the person are listed under 'Position'. The 'Range' indicates a permissible range of the reference position relative to the corresponding rest position. A value range for the 'Range' is set out in Table 1 (e.g. 10-40 cm for the body centre). This reflects the fact that the permissible range can be determined individually for each wearer within the specified range, for example depending on body size, weight, age or other properties of the person 200.

If it is determined by the control unit 130 that a future position of a reference point, for example of the body centre, lies outside the specified range, an appropriate stabilisation strategy will be executed.

The expected change in Table 1 indicates a permissible change in the position of the reference point within the permissible range. In the same way as indicated for the permissible range, a value range within which the permissible change can be set individually for the wearer of system 100, is indicated here as well. If the estimated change in the position of a reference point exceeds the expected (permissible) change, an appropriate stabilisation strategy will be selected and carried out.

This means that it is not only monitored whether the future position is within the permissible range, but also whether the expected change in position exceeds a permissible change. In both cases, a stabilisation strategy is selected and the actuators 120 are controlled accordingly.

Alternatively, or in addition to monitoring the positions of the reference points, the speed, acceleration, angle or rotation rate of the reference points can also be monitored. If these parameters exceed a predetermined threshold value, a stabilisation strategy is selected and executed. For example, a future instability can be detected if the acceleration measured on the back of the person 200 exceeds a value of 2 cm/s2.

Furthermore, instead of or in addition to the positions of the reference points, rotation rates or angles can be monitored and linked to appropriate stabilisation strategies.

The present invention is not limited to the predetermined conditions described above. Instead, further conditions may be defined, defining a permissible range of or change in a position, velocity, or acceleration of a reference point of the body 200.

If the control unit 130, by using the predetermined conditions, determines that an instability of the body is imminent, an appropriate stabilisation strategy is selected and the actuators 120 are activated accordingly.

Possible stabilisation strategies associated with the definitions of an imminent instability may be: support of back and neck, stiffening of the arms to reduce uncontrolled movements, or stiffening of hips, knees and ankle joints for stabilisation purposes.

For example, in the event of a person 200 (head and hands outside the permissible ranges) falling over, a stabilisation strategy is selected, where arm and wrist joints are stiffened by controlling appropriate actuators, in order to prevent the arms or hands from flailing or rotating. In addition, the back is stiffened.

In another example, if a person 200 moves too fast when about to sit down (detected, for example, by the speed of the hips and the angular velocity of the knee joints outside the respectively permissible range), the movement is slowed down by activating the actuators 120, which are attached to the knee joints.

The present invention is, however, not limited to the described stabilisation strategies. Instead, a stabilisation strategy, which is linked to a predetermined condition, represents a control specification for controlling the actuators 120. This specification includes which actuators are controlled at what time, if the relevant condition is met.

Figure 9:
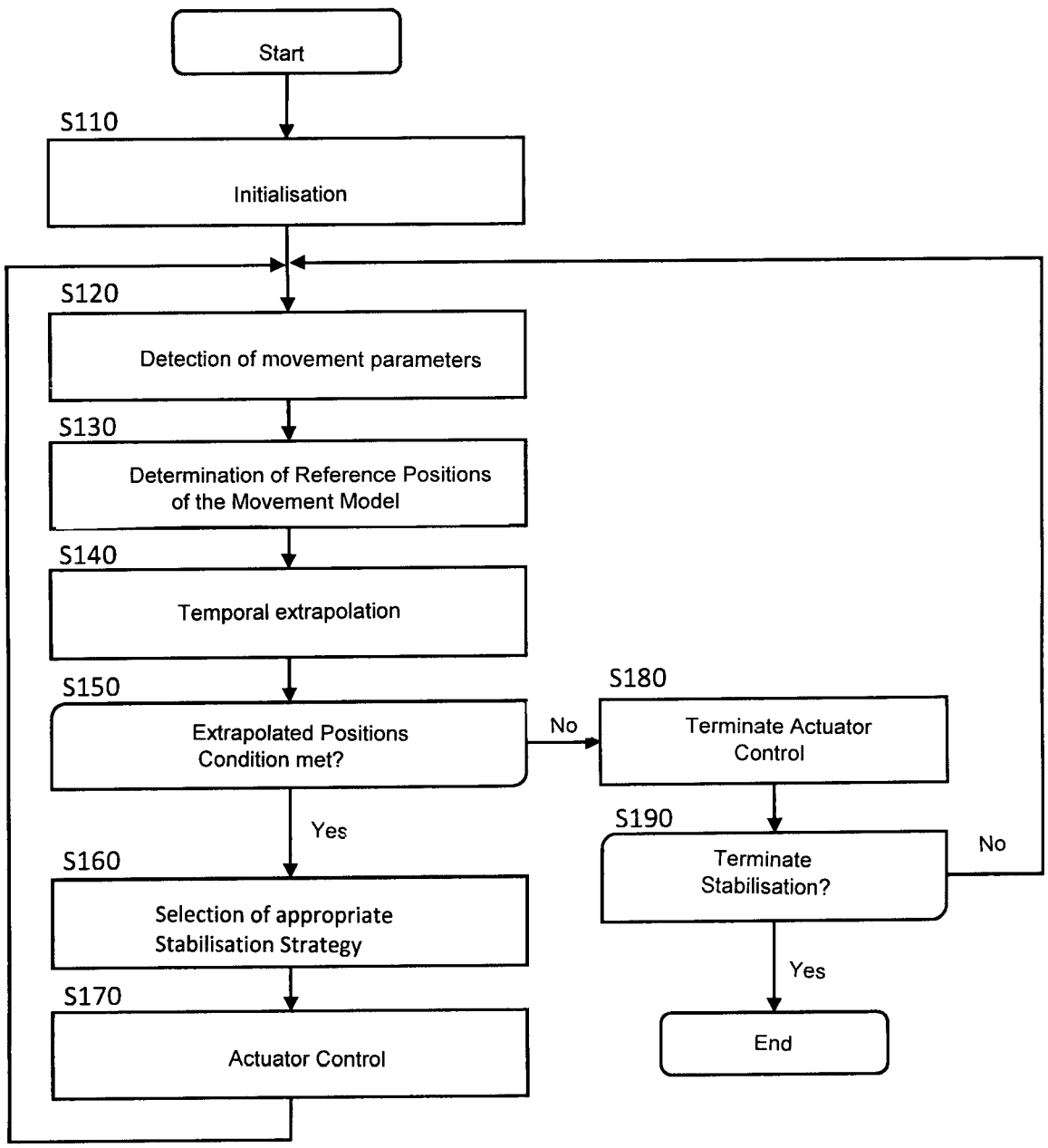
FIG. 9 shows a flow chart of a method for stabilisation support of a moving body.

FIG. 9 schematically shows the steps of a movement-dependent stabilisation support method for maintaining the stability of a moving body 200 according to one embodiment.

After start-up, system 100 is initialised in step S110. Initialisation comprises, for example, the setting of parameters of the movement model, such as, for example, pendulum lengths, masses and spring stiffness. Furthermore, the initialisation may include setting sensor positions on the body 200. The parameters can in this context also be predetermined and stored on a memory unit.

In step S120, the movement parameters are detected by the sensors 110 and passed on to the control unit 130. In step S130, the positions of the biomechanical movement model are determined by the control unit 130 on the basis of the movement parameters, and are temporally extrapolated in step S140, in order to be able to assess an imminent instability of the body.

For this purpose, it is checked in step S150 whether the future positions satisfy predetermined conditions as defined, for example, in Table 1. If one or more conditions is/are met ('yes' in step S150), an appropriate stabilisation strategy is selected in step S160 and is implemented in step S170 by controlling corresponding actuators 120.

Detection of movement parameters and identification of an imminent instability is in this context performed continuously, so that, after/during actuator control, movement parameters continue to be detected and evaluated.

If the temporally extrapolated positions do not satisfy any of the predetermined conditions ('no' in step S150), actuator control is terminated in step S180. Termination of the control is only carried out if the actuators 120 are controlled at the time of estimation of the imminent instability in step S150.

In step S190, it is checked whether the stabilisation support is to be terminated. This can be done, for example, by way of an input by the wearer of system 100. If the stabilisation support is not to be terminated ('no' in step S190), further detection and evaluation of movement parameters takes place. In the event that stabilisation is to be terminated ('yes' in S190), the process for stabilising support is terminated accordingly.

Figure 10:
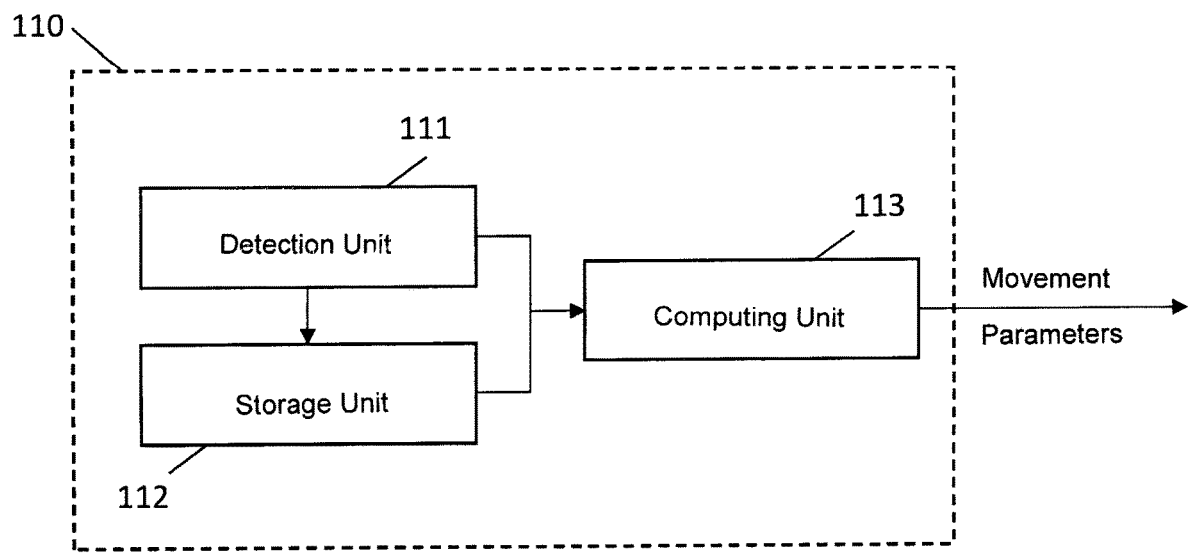
FIG. 10 shows a schematic block diagram of a sensor (MEM-SSC) which forwards to the control unit pre-processed sensor data as movement parameters.

In a first modification of the above-described embodiment, at least one of the sensors 110 contains a detection unit 111, a memory unit 112 and a computing unit 113, as shown in FIG. 10.

The detection unit 111 is designed to detect sensor data which, as set out below, are stored by the memory unit 112. The computing unit 113 processes previous and current sensor data and forwards a processing result to the control unit 130 as movement parameters of the body.

As a result, a portion of data processing is performed by the sensors 120 themselves, instead of by the control unit 130. For example, instead of sensor data, such as an acceleration or a rotation rate, the change in acceleration or the rate of rotation can be detected as movement parameters and transmitted to the control unit 130.

In addition, the memory unit 112 may also include one or more predetermined conditions which are accessed by the computing unit 113 in order to determine already whether a movement parameter satisfies one of the conditions, such that the control unit 130 must control the corresponding actuators 120 to prevent imminent instability. For this reason, such sensors are also referred to as MEM SSC (memory stability management and control).

According to a second modification of the described embodiment, the system 100 comprises, in addition to the plurality of sensors 110, the plurality of actuators 120 and the control unit 130, a plurality of second actuators 140, which are also referred to as active actuators 140.

Figure 11:
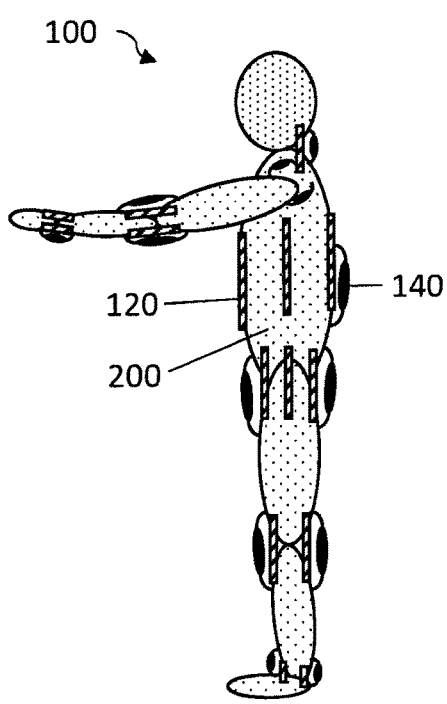
FIG. 11 shows, by way of example, an embodiment of the stabilisation support system, which additionally comprises second actuators which perform an active movement.

FIG. 11, by way of example, shows such a modified embodiment of the stabilisation support system 100, which additionally comprises second actuators 140, which perform an active movement.

The active actuators 140 are in this case attached in the area of the neck, the back, the hips, the knees, the shoulders and the elbows and the foot and wrist joints of the person 200.

In the second modification of the stabilisation system 100, the stabilisation strategies further include control specifications for controlling the second actuators 140, in addition to the control of the actuators 120 which can be stiffened. This makes it possible to limit not only the freedom of movement of the person 200, but moreover to actively influence the movement of the person 200, and thus to again stabilise a body which is already in the process of falling.

The second actuators may be provided, for example, as hydraulic or pneumatic cylinders, piezoelectric drives or conventional electromagnetic drives.

According to a further modification, not only movement parameters, which are detected by corresponding sensors, are used to estimate the future stability of the body, but also other parameters and/or measured values. The totality of the parameters, used to assess the future instability of the body 200, can be referred to as influencing parameters or environmental parameters which influence a movement.

Environmental parameters which influence a movement are, for example, the surface conditions, such as the slip resistance of the surface, for example, in the case of icy grounds or slippery surfaces. Furthermore, the surface conditions can be taken into account. In this case a distinction can be made, for example, between flat and uneven, hard, stony or soft.

Said surface conditions can be defined as an additional parameter in the predetermined conditions. For example, the permissible ranges, velocities, or accelerations may be reduced on a slippery ground. The inclination of the ground can also be taken into account, so that, for example, permissible angles of the movement model in relation to the perpendicular are reduced or increased according to the inclination of the ground.

In addition, the system can take into account sounds, having regard to both, the selection of the stabilisation strategy and the specificity thereof. For this purpose, the system 100 can additionally be equipped with a microphone which detects sounds and forwards these to the control unit 130. The control unit processes the detected sound signal and selects an appropriate stabilisation strategy. For example, the clicking of joints or the intensity of a breathing sound of the wearer of system 100 may indicate his/her/its current physical capacity which is taken into account when selecting the stabilisation strategy.

In addition, the system may be equipped with further sensors, the measured values of which allow to infer an emotional state of the wearer. For example, sensors for measuring skin resistance, pulse, blood pressure and/or sounds are suitable for this purpose. The control unit 130 can determine an emotional state of the wearer on the basis of the detected measured values, and assess the future stability situation, taking into account the detected emotional state. For example, the predetermined conditions may include the detected emotional state as an additional parameter, so that, for example, in conditions of agitation, the wearer is afforded a greater freedom of movement, which, for example, in the case of a calm emotional state, would result in an assessed instability.

In particular, the predetermined conditions for defining an imminent unstable situation of the body, the biomechanical movement model and the stabilisation strategies can be defined/initialised by taking into account individual parameters. In that regard, for example, parameters such as gender, physical condition, age, known physical movement restrictions (e.g. caused by pain) or currently taken medication, may be taken into consideration.

During the process of stabilisation, the body is thus subjected to the evaluation of two types of influencing parameters. On the one hand, the evaluation is based on data received from various sensors and other signal transmitters in real time, and, on the other hand, is based on the evaluation of existing profile data.

All influencing parameters may play a different role individually, in groups or in sum with regard to the predetermined conditions and corresponding stabilisation strategies.

The overall concept of the present invention can thus be described as an adaptive safety cage, where an imminent fall of the movable body is prevented by targeted interventions through the control of the actuators 120, in that the freedom of movement of the body is restricted in such a way that further movement towards the imminent unstable state is prevented or inhibited.

In this case, the actuator technology may be designed in two stages. Thus, joints and the back region can be provided with overlapping structures having separately-controllable chambers of magneto-fluidic stabilisers in order to carry out a situation-dependent passive stabilisation by way of precise situational stiffening. A second stage makes it possible to counteract a fall and to straighten the body if stabilisation by stiffening is not sufficient, for example by using hydraulic or pneumatic cylinders, piezoelectric drives or conventional electromagnetic drives.

For supplying power to system 100, for example a power supply system, such as a battery system, may be used, which is distributed within the system 100. The distribution of the energy storage means increases comfort and improves the passive stability compared to a central energy supply system.

The system 100 may further comprise a programming interface (API) via which current data for describing the instability can be transmitted, so that they are used for later optimisation of the personalised parameters. In particular, the effect of a performed stabilisation can be determined and stored, in order then to be able to be transmitted to an external device via the API which optimises the predetermined conditions and the corresponding stabilisation strategies. The movement-dependent stabilisation support system 100 can be embedded in a smart textile product.

In summary, the present invention relates to a movement-dependent stabilisation support system for stabilising a moving body which comprises a plurality of sensors and actuators and a control unit. The plurality of sensors continuously detects movement parameters of the body, on the basis of which the control unit determines whether an instability of the body is imminent. If it is determined that an instability is imminent, the control unit selects a stabilisation strategy according to which the actuators are controlled. When controlled, the actuators attached to the body stiffen and limit the freedom of movement of the body, so that a movement in the direction of the imminent unstable state is prevented or suppressed. In this way, the body is supported in its stabilisation and an imminent fall is prevented.

The invention claimed is:

1. A movement-dependent stabilization support system for maintaining the stability of a moving body, comprising:
a plurality of sensors, designed to detect movement parameters of the body;
a plurality of actuators; and
a control unit, designed:
to define a support base utilizing contact points of feet of the body and a standing plane of the body;
to detect whether an instability of the body is imminent, based on the movement parameters and a mathematical movement model including a location of a center of gravity of the body in relation to the support base,
to select a stabilization strategy from a plurality of predetermined stabilization strategies when it has been detected that an instability of the body is imminent,
to control the actuators according to the selected stabilization strategy, wherein the actuators are flexibly-deformable, and stiffen when controlled by the control unit,
to determine positions of predetermined reference points of the mathematical movement model, on the basis of the movement parameters of the body received, and
to detect the imminent instability of the body, based on trajectories of the reference points of the mathematical movement model.

2. The movement-dependent stabilization support system according to claim 1, wherein the control unit is further designed to perform a control process for terminating the actuator control for stabilization purposes, based on the movement parameters.

3. The movement-dependent stabilization support system according to claim 1 or 2, wherein the mathematical movement model is based on formalizing the movement of a simple inverted pendulum or double-inverted pendulum.

4. The movement-dependent stabilization support system according to claim 1, wherein the mathematical movement model is based on formalizing the movement of a simple inverted pendulum on an elastic spring or a double-inverted pendulum on an elastic spring.

5. The movement-dependent stabilization support system according to claim 1, wherein the mathematical movement model is an expanded mathematical movement model of the body, modelling a human body's muscular system for persons of different ages by means of a system of inverted pendulums connected to elastic springs.

6. The movement-dependent stabilization support system according to claim 1, wherein the control unit detects the imminent instability of the body by calculating future positions, based on changes between previous and current positions of the reference points of the mathematical movement model, and recognizes that an instability of the body is imminent, if the future positions satisfy at least one condition from a plurality of predetermined conditions.

7. The movement-dependent stabilization support system according to claim 1, wherein the sensors each comprise a detection unit, a storage unit, and a computing unit, wherein the detection unit is designed to detect sensor data, the storage unit is designed to store the sensor data, and the computing unit is designed to process previous and current sensor data and record a processing result as movement parameters of the body.

8. The movement-dependent stabilization support system according to claim 1, wherein the control unit, after detecting the imminent instability of the body, based on movement parameters of the body, recognizes whether or not the instability of the body persists, and controls the actuators accordingly.

9. The movement-dependent stabilization support system according to claim 1, wherein the actuators have a tube-like shape and are filled with a magnetically-sensitive or electrically-sensitive medium which is stiffened, when controlled by the control unit.

10. The movement-dependent stabilization support system according to claim 1, wherein the actuators include a magnetorheological fluid that stiffens upon application of a magnetic field, and the actuators each comprise a magnetic field generator which, when controlled by the control unit, generates a magnetic field for stiffening the magnetorheological fluid.

11. The movement-dependent stabilization support system according to claim 1, wherein the sensors are inertial measuring units which detect accelerations or rotation rates as movement parameters of the body.

12. The movement-dependent stabilization support system according to claim 1, wherein the moving body is a person or a humanoid robot.

13. The movement-dependent stabilization support system according to claim 12, wherein the plurality of sensors is designed to be attached to at least hips, shoulders, hands, and head of the person or humanoid robot.

14. The movement-dependent stabilization support system according to claim 12 or 13, wherein the plurality of actuators is designed to be attached in the region of joints and/or the torso of the person or humanoid robot, in order to restrict the freedom of movement of the joints and/or of the torso by stiffening, when controlled by the control unit.

15. The movement-dependent stabilization support system according to claim 1, further comprising a plurality of second actuators, designed to perform an active movement, when controlled by the control unit, wherein the control unit is further designed to control the second actuators according to the selected stabilization strategy.

16. The movement-dependent stabilization support system according to claim 1, wherein the detecting of the imminent instability is in part based on a distance range between the center of gravity and the support base of 5-35 cm.

17. The movement-dependent stabilization support system according to claim 6, wherein the at least one condition from the plurality of predetermined conditions is a distance range of the reference point relative to a corresponding rest position, the reference point and the distance range being selected from the group consisting of the center of gravity between 10-40 cm, a left hip between 10-15 cm, a right hip between 15-15 cm, a right shoulder between 10-60 cm, a left shoulder between 10-60 cm, and a distance between the center of gravity and the support base of 5-35 cm.

18. The movement-dependent stabilization support system according to claim 1, wherein the trajectories of the mathematical movement model are based on formalizing the movement of a double-inverted pendulum on an elastic spring based on an equation of $$\ddot{y}_s - m_1 l_1 \dot{\theta}^2 \cos\theta + m_2 \ddot{y}_s - m_2 l_1 \ddot{\theta} \sin\theta - m_2 l_1 \dot{\theta} \cos\theta - m_2 l_2 \ddot{\varnothing} \sin\varnothing - m_2 l_2 \dot{\varnothing} \cos\varnothing + m_1 g + m_2 g + k(y_s - i_0) = 0$$

where $m_1$ is a mass of a first pendulum, $m_2$ is a mass of a second pendulum, $l_1$ is a length of the first pendulum, $l_2$ is a length of the second pendulum, $\theta$ is an angle between a first vertical plane and the length of the first pendulum, $\varnothing$ is an angle between a second vertical plane and the length of the second pendulum, y is a spring deflection, k is a spring stiffness and g is a direction of gravitational acceleration.

19. A movement-dependent stabilization support method for maintaining stability of a moving body, the method comprising the steps of:
providing a movement-dependent stabilization support system comprising:
a plurality of sensors;
a plurality of actuators; and
a control unit;
detecting movement parameters of the body utilizing the sensors;
defining by the control unit a support base utilizing contact points of feet of the body and a standing plane of the body;
recognizing by the control unit whether an instability of the body is imminent, based on the movement parameters and a mathematical movement model including a location of a center of gravity of the body in relation to the support base;
determining by the control unit positions of predetermined reference points of the mathematical movement model, on the basis of the movement parameters of the body received;
detecting by the control unit an imminent instability of the body, based on trajectories of the reference points of the mathematical movement model;
selecting by the control unit a stabilization strategy from a plurality of predetermined stabilization strategies, when it has been detected that instability of the body is imminent; and
stiffening the actuators according to the selected stabilization strategy.

* * * * *